(12) United States Patent
Gill

(10) Patent No.: US 6,608,730 B1
(45) Date of Patent: Aug. 19, 2003

(54) APPENDED DATA RECORDING ON MAGNETIC TAPE

(75) Inventor: Richard A. Gill, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/443,580

(22) Filed: Nov. 18, 1999

(51) Int. Cl.$^7$ ............................................... G11B 15/18
(52) U.S. Cl. ........................ 360/72.1; 360/50; 360/13
(58) Field of Search .......................... 360/72.1, 13, 50, 360/53

(56) References Cited

U.S. PATENT DOCUMENTS

| | | | |
|---|---|---|---|
| 3,918,090 A | | 11/1975 | Ludwig et al. |
| 4,176,380 A | * | 11/1979 | Koski et al. ................... 360/50 |
| 4,327,382 A | * | 4/1982 | Tanaka ......................... 360/13 |
| 4,758,906 A | * | 7/1988 | Culp ............................ 360/39 |
| 5,113,295 A | | 5/1992 | Sudoh et al. |
| 5,373,401 A | * | 12/1994 | Bentley et al. ................ 360/50 |
| 5,475,542 A | | 12/1995 | Bentley et al. |
| 5,570,242 A | * | 10/1996 | Leonhardt et al. ............. 360/48 |
| 5,619,384 A | * | 4/1997 | Leonhardt et al. ............. 360/48 |

FOREIGN PATENT DOCUMENTS

| | | |
|---|---|---|
| EP | 0420374 | 4/1991 |
| WO | 9927529 | 6/1999 |

* cited by examiner

*Primary Examiner*—David Hudspeth
*Assistant Examiner*—K. Wong
(74) *Attorney, Agent, or Firm*—Brooks & Kushman P.C.

(57) ABSTRACT

Reducing the gap distance between existing data and appended blocks increases the information density written onto magnetic tape. A narrow gap spacing may be achieved by reading the existing block of data with a read module leading the write module in the tape direction. The end of the existing data is determined from data read by the leading read module. Delaying appending data by a gap period introduces the gap between the existing block of data and the new block of data to be appended. The new block of data is written following the gap and verified by reading with a read module following the write module in the tape direction.

11 Claims, 5 Drawing Sheets

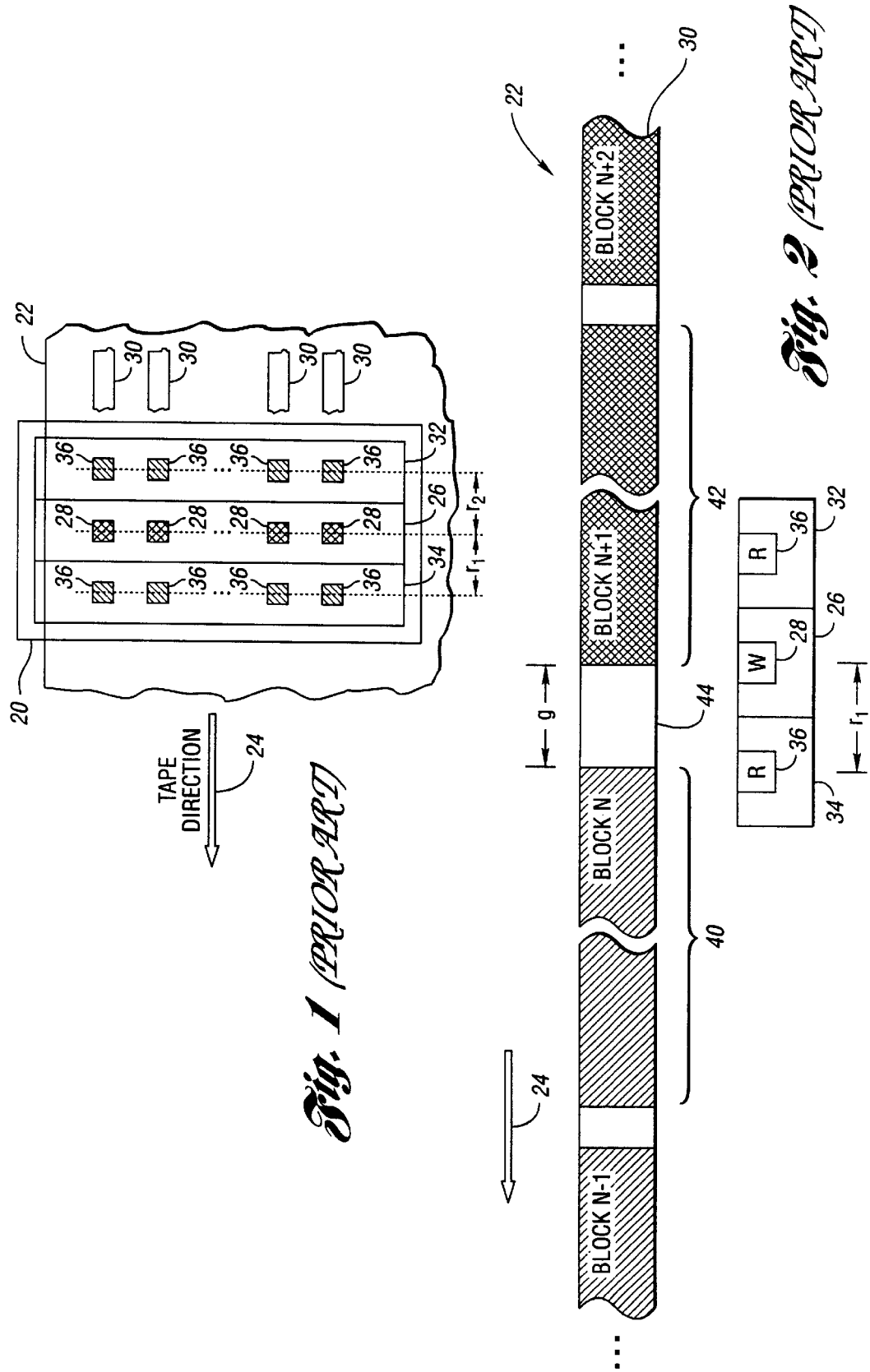

APPENDED DATA RECORDING ON MAGNETIC TAPE

TECHNICAL FIELD

The present invention relates to appending data onto magnetic tape.

BACKGROUND ART

Data is written onto magnetic tape for storage and subsequent retrieval. Generally, data is written onto the tape in contiguous blocks separated by gaps. The gaps delimit blocks and assist in finding the beginning of a particular block during read operations. When a steady stream of data is available, blocks are written onto the tape continuously. However, new blocks of data are often appended after existing blocks as data becomes available. These append operations may write on clean tape or may write over old existing data that is no longer needed.

A typical tape access system includes a tape head with a write module and a read module trailing the write module in the direction of tape travel. The write module contains a plurality of write elements for simultaneously writing many data tracks. Similarly, the trailing read module will include a plurality of read elements for simultaneously reading the data tracks. Following each write element with a read element permits immediate read after write to verify that data has been correctly written onto the tape. A servo controller controls one or more motors for moving the tape past the tape head in a particular direction and at a particular speed. Write circuitry converts data into write module write signals. Read circuitry converts read module read signals into data. The read circuitry also detects the end of a block and signals a control unit, which generates a gap-out signal to the servo controller. The servo controller remembers the tape location corresponding to the gap-out signal. The servo controller then generates a gap-in signal whenever the tape is a preset distance before the remembered location of the end of the block.

During an append operation, the gap spacing may be set by any of several methods. A first method is to wait a preset period of time after receiving the gap-in signal from the servo controller. The accuracy of this method depends on precise timing of the gap-in signal. A second method is to begin writing appended data after the trailing read module reads the end of the last data block. While this method is more accurate than relying on the gap-in signal, the gap distance can be no less than the distance between read element and write elements in the direction of tape travel.

The desire to increase the density of information stored on magnetic tape drives the need to narrow the gap distance. Narrowing the gap distance by decreasing the distance between a write element and the corresponding read element increases the manufacturing cost of the read head and increases the possibility of significant cross-talk or direct coupling of the magnetic signal produced by the write element into nearby read elements. Narrowing the gap distance in systems relying on the gap-in signal increases the cost and complexity of the servo controller due to the tighter timing tolerance required to prevent either overwriting the end of an existing block of data or not overwriting old, unwanted data under the appended data block.

What is needed is to achieve higher tape data density by shortening the gap distance between data blocks without increasing the possibility of lost or erroneous data and without substantially increasing the cost or complexity of the tape access system.

DISCLOSURE OF INVENTION

It is an object of the present invention to reduce the gap distance between existing data and appended data.

It is another object of the present invention to increase the accuracy of an appended data block starting location.

It is still another object of the present invention to reduce the possibility of overwriting the end of an existing block when appending new data.

It is yet another object of the present invention to reduce the possibility of not overwriting old, unerased data when appending new data.

It is a further object of the present invention to reduce tolerance requirements for the gap location signal generated by the servo controller.

In carrying out the above objects and other objects and features of the present invention, a method for appending data to existing data on magnetic tape is provided. The tape travels past a tape head having a write module between a leading read module and a trailing read module in the direction of tape travel. Data is read with the leading read module. The end of the existing data is determined from the data read by the leading read module. A gap period is delayed to introduce a gap between the existing data and appended data. The appended data is written following the gap with the write module. The written data is verified by reading with the trailing module.

In an embodiment of the present invention, a servo controller generates a signal indicating the approach of the end of existing data. The method further includes waiting to read existing data until the signal is generated.

In another embodiment of the present invention, a data selector selects between reading from the leading read module and from the trailing read module. The method further includes selecting the leading read module before reading existing data and selecting the trailing read module after determining the end of the existing data.

In still another embodiment of the present invention, the tape direction may be reversed. The leading read module may then function as the trailing read module and the trailing read module may then function as the leading read module when data is to be appended in the reverse tape direction.

A system for appending data to existing data on magnetic tape is also provided. The system includes a tape head for accessing the tape. The tape head has a write module between a leading read module in front of the write module in the direction of tape travel and a trailing read module in back of the write module. A tape drive moves magnetic tape past the tape head. A data write circuit generates write module write signals from received data. A data read circuit generates transmitted data from read module read signals. A control unit enables the data read circuit to read with the leading read module, enables the data read circuit to determine the end of the existing data, delays a gap period to introduce a gap between the existing data and appended data, enables the data write circuit to write appended data, and enables the data read circuit to read the appended data with the trailing read module.

In an embodiment of the present invention, the system includes a servo controller to control the tape speed and direction and to generate a gap-in signal indicating the approach of the end of existing data. The control unit waits to read existing data until the gap-in signal is generated. The control unit generates a gap-out signal based on detection of the end of existing data by the data read circuit.

In another embodiment of the present invention, the system includes a data selector forwarding to the read circuit either read signals from the leading read module or from the trailing read module based on a select control signal. The control unit sets the select control signal to forward leading read module read signals before enabling the data read circuit to read existing data and to set the select control signal to forward trailing read module read signals after the data read circuit determines the end of the existing data.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic drawing of a tape head that may be used in the present invention;

FIG. 2 is a schematic diagram illustrating a prior art data appending method;

BEST MODE FOR CARRYING OUT THE INVENTION

Figure 3:
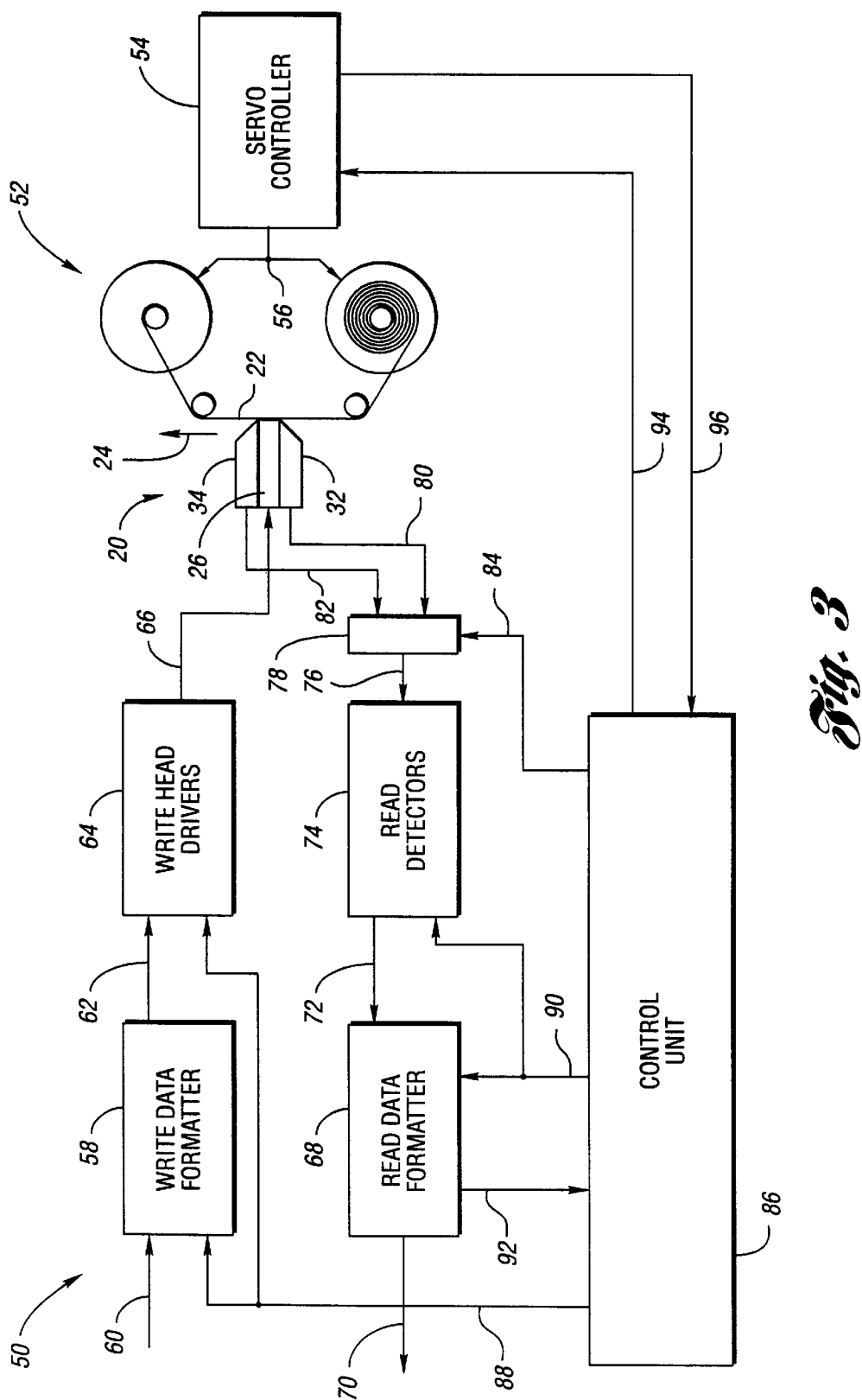
FIG. 3 is a block diagram of a system for appending data onto magnetic tape according to an embodiment of the present invention.

Referring to FIG. 1, a schematic diagram of a tape head that may be used in the present invention is shown. Tape head 20 accesses magnetic tape 22 as tape 22 moves past head 20 in tape direction 24. Tape head 20 includes write module 26 having multiple write elements 28. Write elements 28 simultaneously write data tracks 30 onto magnetic tape 22. Tape head 20 also includes leading read module 32 preceding write module 26 in tape direction 24 and trailing read module 34 following write module 26 in tape direction 24. Each read module 32,34 includes one read element 36 corresponding to each write element 28. Read elements 36 read data from data tracks 30 as tape 22 moves past tape head 20. In addition to reading data tracks 30 on playback, read elements 36 in trailing read module 34 perform read-after-write to verify that data just written onto tape 22 is correct. Read elements 36 in leading read module 32 permit read-after-write when tape direction 24 is reversed. In this case, leading read module 32 functions as the trailing read module.

Typically, read elements 36 in read module 32,34 and write elements 28 in write module 26 are aligned normal to tape direction 24. The spacing between write element 28 and corresponding read element 36 in trailing read module 34, known as the write-to-trailing read head spacing, is indicated by $r_1$. Similarly, the distance between write element 28 and corresponding read element 36 in leading read module 32, known as the write-to-leading read head spacing, is shown by $r_2$.

Referring now to FIG. 2, a schematic diagram illustrating a prior art data appending method is shown. One element 28,36 from each module 26, 32, 34 in tape head 20 is shown accessing data track 30. Data written onto data track 30 is divided into blocks separated by gaps. In addition to delimiting the blocks, gaps simplify locating block starting locations. If data to be written onto tape 22 arrives in a continuous stream, all blocks may be written in one pass of tape 22 by head 20. Frequently, however, data may arrive at different times, requiring an append operation.

In FIG. 2, block N, indicated by 40, represents the last data block currently written on data track 30. An appended data block N+1, indicated by 42, is to be written following existing block 40. Gap 44 separates existing block 40 from appended block 42 by a gap distance g.

One method of inserting gap 44 following block 40 in an append operation is to rewind tape 22 then accelerate tape 22 in tape direction 24 until tape 22 is traveling at an appropriate speed past head 20. Trailing read module 34 reads existing block 40. When the end of block 40 is detected, write module 26 begins writing appended block 42. This technique inserts gap 44 having gap length g no less than write-to-trailing read head spacing $r_1$.

Referring now to FIG. 3, a block diagram of a system for appending data onto magnetic tape according to an embodiment of the present invention is shown. A tape access system, shown generally by 50, includes a tape drive, shown generally by 52, for moving tape 22 past head 20 in tape direction 24. Servo controller 54 generates servo signals 56 for tape drive 52 to set the speed and direction of tape 22. Write data formatter 58 accepts input data 60 and generates formatted data 62. Data formatting may include partitioning data for simultaneous storage on data tracks 30, introducing error detection and correction information, encoding, and the like. Write head drivers 64 accept formatted data 62 and generate write signals 66 for each write element 28 in write module 26. Read data formatter 68 generates output data 70 from read data 72 by performing the reverse operations of write data formatter 58. Read detectors 74 include preamplifiers and pulse detectors for generating read data 72 from read signals 76. Selector 78 outputs as read signals 76 either leading read signals 80 from read elements 36 in leading read module 32 or trailing read signals 82 from read elements 36 in trailing read module 34 based on select control signal 84.

Control unit 86 sets select control signal 84. Control unit 86 also generates write enable 88 and read enable 90 controlling write circuitry 58,64 and read circuitry 68,74, respectively. Control unit 86 accepts status signal 92 from read data formatter 68 indicating, among other parameters, the end of a block of read data. Control unit 86 generates gap-out signal 94 to servo controller 54 indicating that the end of a block has been detected. Servo controller 54 remembers the end-of-block location along tape 22. If tape 22 is rewound and played back, servo controller 54 generates gap-in signal 96 a preset distance prior to the end-of-block location. During an append operation, control unit 86 sets selector 78 to read existing data with leading read module 32. Read data formatter 68 signals the block end through status signal 92. A gap delay period introduces gap 44 between existing data block 40 and appended data block 42. Control unit 86 begins appending data following gap 44 by asserting write enable 88. Selector 78 is set to pass trailing read signals 82 to verify the correctness of the data written.

Figure 4:
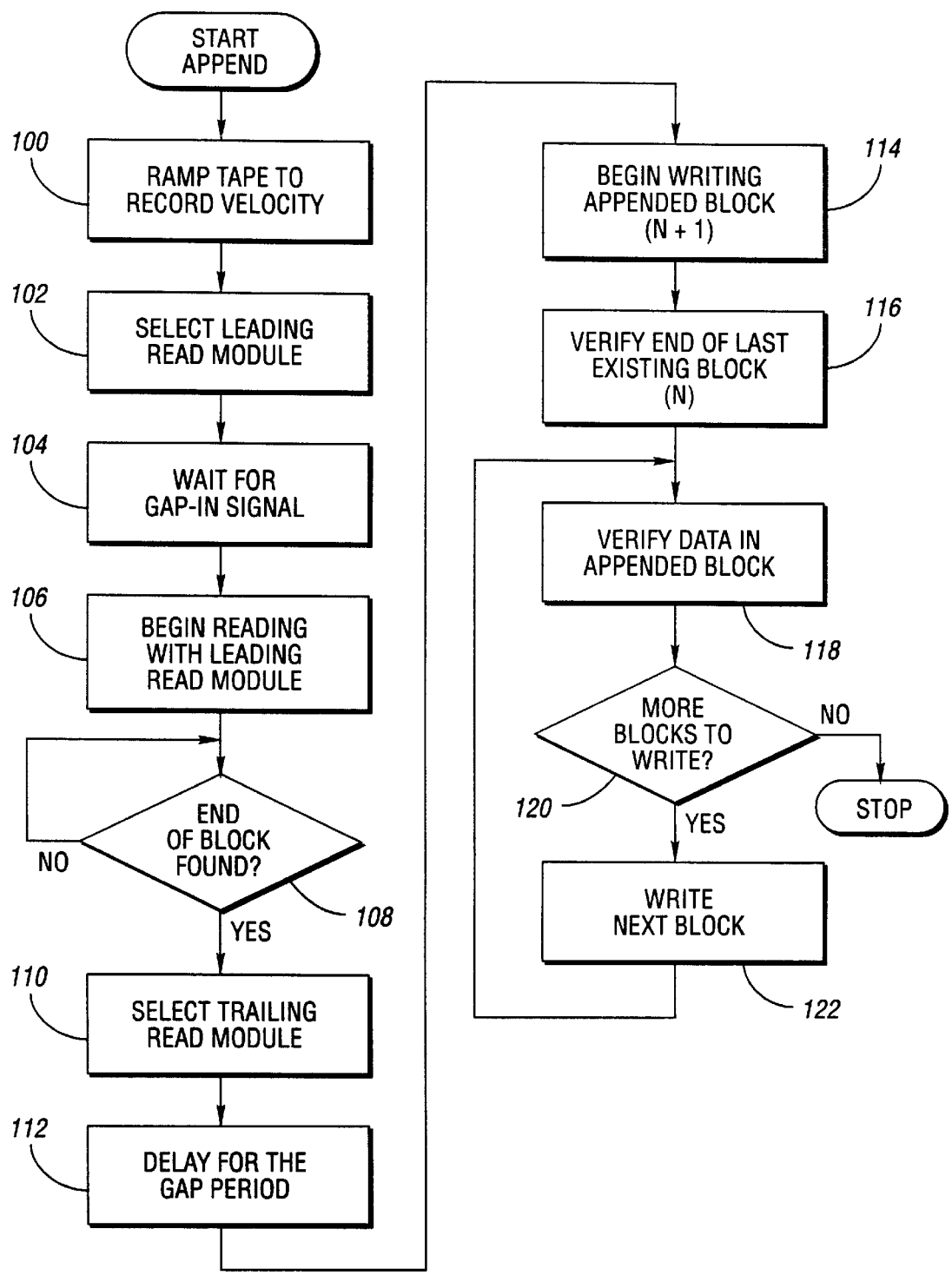
FIG. 4 is a flow diagram illustrating a method for appending data onto magnetic tape according to an embodiment of the present invention.

Referring now to FIG. 4, a flow diagram illustrating a method for appending data onto magnetic tape according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Servo controller 54 commands tape drive 52 to ramp tape 22 to record velocity as indicated by 100. Control unit 86 sets select control signal 84 to pass leading read signals 80 from leading read module 32 to read detectors 74 as indicated by 102. Control unit 86 then waits for gap-in signal 96 in block 104. Servo controller 54 generates gap-in signal 96 a time period, $T_{GAP-IN}$, as indicated in Equation 1:

$$T_{GAP-IN} = \frac{r_1 + r_2 + d}{v} + \tau \qquad (1)$$

where v is the velocity of tape 22 past head 20, d is the desired distance to begin reading prior to the end of existing block 40, and τ is the allowable tolerance in the timing of gap-in signal 96. Once gap-in signal 96 is received, tape 22 is read by leading read module 32, as indicated by 106.

Figure 5:
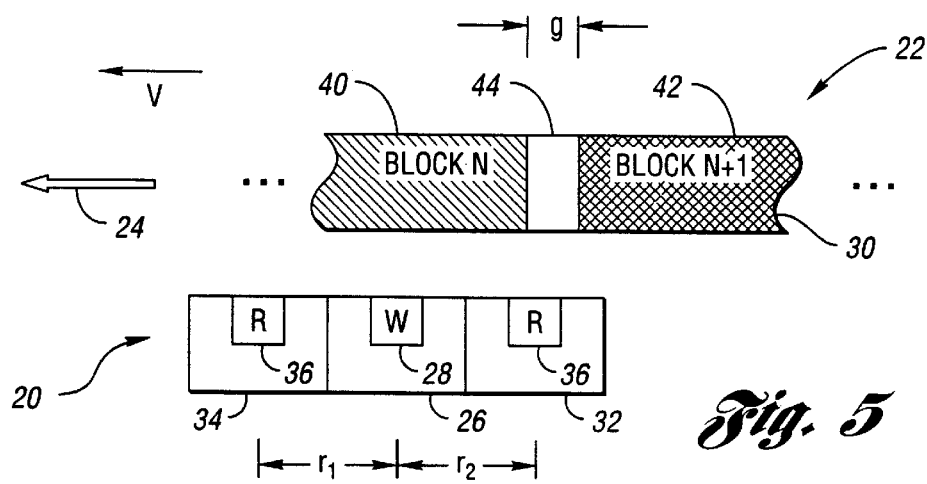
FIG. 5 is a schematic diagram illustrating tape position relative to the tape head when the end of an existing block of data is detected according to an embodiment of the present invention.

Referring now to FIG. 5, with continued reference to FIG. 4, a schematic diagram illustrating tape position relative to the tape head when the end of an existing block of data is detected according to an embodiment of the present invention is shown. Read element 36 in leading read module 32 detects the end of block 40. Leading read module 32 continues reading tape 22 until the end of block 40 is found, as indicated by 108. The expected time between receiving gap-in signal 96 and detecting the end of block 40, $T_D$, is indicated by Equation 2:

$$\frac{d}{v} - \tau \leq T_D \leq \frac{d}{v} + \tau \qquad (2)$$

Selector 78 is set by select control signal 84 to pass trailing read signals 82 to read detectors 74, as indicated by 110.

Figure 6:
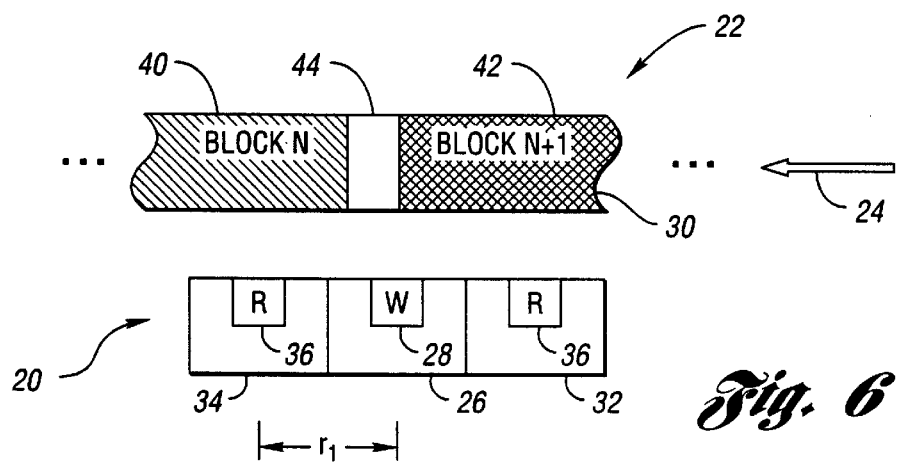
FIG. 6 is a schematic diagram illustrating tape position relative to the tape head when writing of the appended data block begins according to an embodiment of the present invention.

Referring now to FIG. 6, with continued reference to FIG. 4, a schematic diagram illustrating tape position relative to the tape head when writing of the appended data block begins according to an embodiment of the present invention is shown. Control unit 86 delays the beginning of writing appended block 42 for gap period, $T_{GAP}$, as indicated by 112. The gap delay period is determined by Equation 3:

$$T_{GAP} = \frac{r_2 + xg}{v} \qquad (3)$$

where x is an inter-block splice value between zero and one permitting early write initiation to ensure any previous data is completely overwritten. The relative position between tape head 20 and tape 22 shown in FIG. 6 illustrates the onset of appending data in block 42. By using this method, the width of gap 44 may be set independent of the distance between write element 28 and corresponding read element 36 in trailing read module 34.

Figure 7:
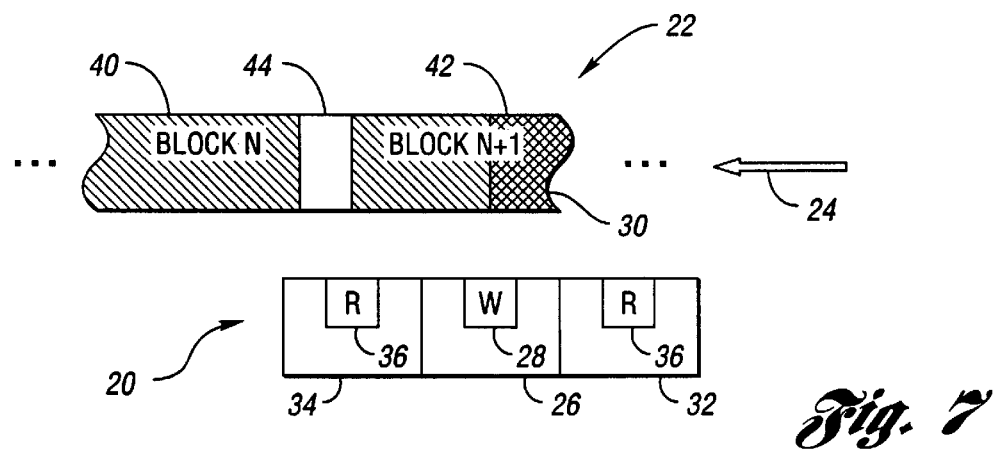
FIG. 7 is a schematic diagram illustrating tape position relative to the tape head when read-after-write of the appended data begins according to an embodiment of the present invention.

Referring now to FIG. 7, with continued reference to FIG. 4, a schematic diagram illustrating tape position relative to the tape head when read-after-write of the appended data begins according to an embodiment of the present invention is shown. Data is written into appended block 42, as indicated by 114. Read element 36 in trailing read module 34 verifies the end of existing block 40, as indicated by 116. After crossing gap 44, read elements 36 in trailing read module 34 verify data in appended block 42, as indicated by 118. The relative position of tape 22 with respect to tape head 20 in FIG. 7 illustrates the onset of appended block 42 verification by trailing read module 34.

A check is made to determine if more blocks are to be written onto tape 22, as indicated by 120. If so, the next block is written, as indicated by 122, and verified, as indicated by 118.

Figure 8:
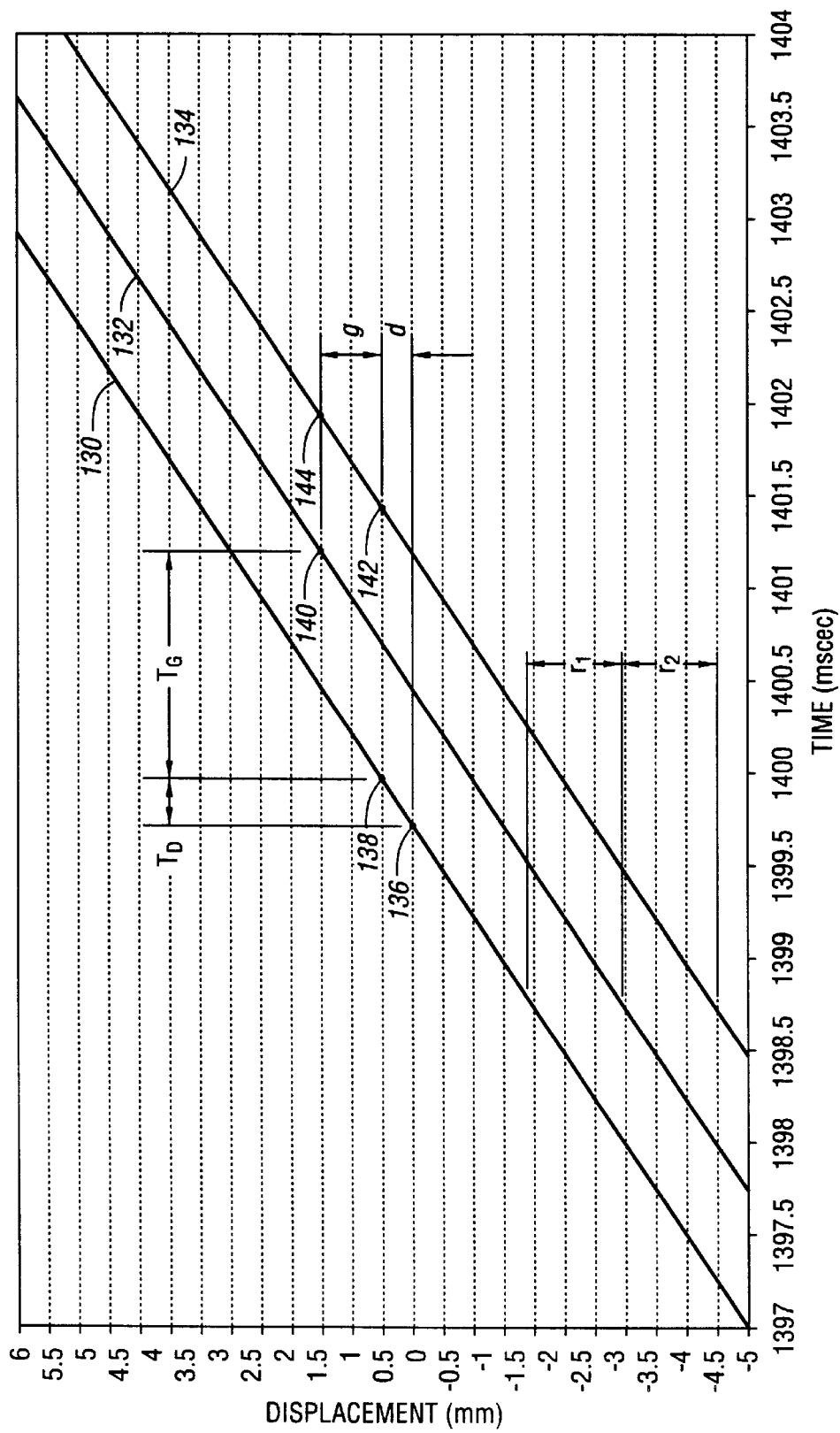
FIG. 8 is a graph illustrating tape position as a function of time for a leading read module, a write module, and a trailing read module during an append operation according to an embodiment of the present invention.

Referring now to FIG. 8, a graph illustrating tape head position as a function of time for a leading read module, a write module, and a trailing read module during an append operation according to an embodiment of the present invention is shown. Curve 130 represents the position of leading read module 32, curve 132 the position of write module 26, and curve 134 the position of trailing read module 34. For this example, the spacing between write element 28 and either corresponding read element 36 is 1.524 mm, the desired gap distance g is 1.0 mm, the distance before the end of existing block 40 to begin reading with leading read module 32, d, is 0.5 mm, and the velocity of tape 22 is 2.0 meters per second. The dependent axis shows displacement with zero at the end of existing block 40. The independent axis is arbitrary time.

Gap-in signal 96 is received by control unit 86 at point 136. Leading read module 32 crosses the end of existing block 40 at point 138. After waiting the gap delay period, $T_{GAP}$, control unit 86 begins writing appended block 42 at point 140. Trailing read module 34 verifies the end of existing block 40 at point 42 and begins reading appended block 42 at point 144.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for appending data to existing data on magnetic tape accessed by a tape head having a write module between a leading read module and a trailing read module in the direction of tape travel past the tape head comprising:

reading existing data with the leading read module;

determining the end of the existing data from the data read by the leading read module;

delaying a gap period to introduce a gap between the existing data and appended data;

writing appended data following the gap with the write module; and verifying the written data by reading the written data with the trailing read module.

2. A method for appending data as in claim 1 wherein tape motion is controlled by a servo controller operative to generate a signal indicating the approach of the end of existing data, the method further comprising waiting to read existing data until the signal is generated.

3. A method for appending data as in claim 1 wherein a data selector selects between reading from the leading read module and reading for the trailing read module, the method further comprising selecting the leading read module before reading existing data and selecting the trailing read module after determining the end of the existing data.

4. A method for appending data as in claim 1 wherein the tape direction may be reversed, the method further comprising making the leading read module function as the trailing read module and making the trailing read module function as the leading read module when data is to be appended in the reverse tape direction.

5. A system for appending data to existing data on magnetic tape comprising:
- a tape head for accessing the tape, the tape head comprising a write module between a leading read module in front of the write module in the direction of tape travel past the tape head and a trailing read module in back of the write module in the direction of tape travel past the tape head, the write module operative to write data simultaneously on at least one data track on the tape, each read module operative to simultaneously read at least one data track on the tape;
- a tape drive for moving magnetic tape past the tape head in the tape direction;
- a data write circuit in communication with the write module, the data write circuit operative to generate write module write signals from received data;
- a data read circuit in communication with the leading read module and the trailing read module, the data read circuit operative to generate transmitted data from read module read signals; and
- a control unit in communication with the data write circuit and the data read circuit, the control unit operative to
  (a) enable the data read circuit to read existing data with the leading read module,
  (b) enable the data read circuit to determine the end of the existing data from the data read by the leading read module,
  (c) delay a gap period to introduce a gap between the existing data and appended data,
  (d) enable the data write circuit to write appended data with the write module following the gap, and
  (e) enable the data read circuit to read the appended data with the trailing read module.

6. A system for appending data to existing data as in claim 5 further comprising a servo controller in communication with the tape drive and the control unit, the servo controller operative to control tape speed and direction and to generate a gap-in signal indicating the approach of the end of existing data, the control unit further operative to wait before reading existing data until the gap-in signal is generated.

7. A system for appending data to existing data as in claim 6 wherein the control unit generates a gap-out signal based on detection of the end of existing data by the data read circuit, the servo controller generating the gap-in signal based on the gap-out signal.

8. A system for appending data to existing data as in claim 5 further comprising a data selector forwarding to the read circuit either read signals from the leading read module or read signals from the trailing read module based on a select control signal, the control unit operative to set the select control signal to forward leading read module read signals before enabling the data read circuit to read existing data and to set the select control signal to forward trailing read module read signals after the data read circuit determines the end of the existing data.

9. A method for appending a new block of data a gap distance after an existing block of data on magnetic tape moving past a tape head in a tape direction, the tape head including a write module for appending data, the method comprising:
- reading the existing block of data with a read module leading the write module in the tape direction;
- determining the end of the existing data from the data read by the leading read module;
- delaying a gap period to introduce the gap between the existing block of data and the new block of data to be appended;
- writing the new block of data following the gap with the write module; and
- verifying the written block of data by reading the written data with a read module following the write module in the tape direction.

10. A method for appending a new block of data as in claim 9 wherein tape motion is controlled by a servo controller operative to generate a signal indicating the approach of the end of the existing block of data, the method further comprising waiting to read the existing block of data until the signal is generated.

11. A method for appending a new block of data as in claim 9 wherein a data selector selects between reading from the leading read module and reading for the trailing read module, the method further comprising selecting the leading read module before reading the existing data block and selecting the trailing read module after determining the end of the existing data block.

* * * * *